United States Patent Office 3,364,243
Patented Jan. 16, 1968

---

3,364,243
COBALTOUS HALIDE-2-BUTYNE-1,4-DIOL COMPLEXES
Wiley E. Daniels, Easton, Pa., assignor to General Aniline & Film Corporation, New York, N.Y., a corporation of Delaware
No Drawing. Filed Oct. 8, 1964, Ser. No. 402,643
8 Claims. (Cl. 260—439)

This invention relates to cobaltous halide-2-butyne-1,4-diol complexes having several new and useful commercial applications and to the process of preparing the same.

There is nothing in the literature describing the preparation of simple co-ordination complexes of 2-butynediol-1,4 and cobalt halides. Attempts to prepare complexes of cobaltous chloride with the following acetylenic compounds were unsuccessful:

$HC \equiv CCH_2OH$
Propynol
$EtOOC-C \equiv C-COOEt$
Diethyl-acetylenedicarboxylate
$CH_3COOCH_2C \equiv CCH_2OOC-CH_3$
Butynediol diacetate
$H_3C-CH_2CH_2-C \equiv C-CH_3$
2-hexyne
$C_6H_5C \equiv CH$
Phenyl acetylene

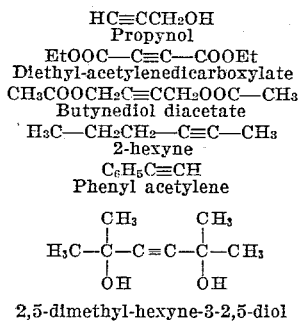

2,5-dimethyl-hexyne-3-2,5-diol

Attempts to prepare complexes of butynediol with other transition metal salts such as nickel halides and palladium were likewise unsuccessful.

I have discovered that when two moles of 2-butynediol-1,4 (hereinafter referred to simply as butynediol) are reacted with one mole of a cobaltous halide, such as bromide, chloride or iodide, in solution of acetone at room temperature or slightly above, i.e., not exceeding 30–40° C., either a deep blue solution forms or a small amount of pink crystals precipitate. In any event, the reaction solution (mother liquor) is evaporated to dryness and a pink crystalline complex is isolated which is most likely bonded through the electrons of the triple bond and the hydroxyl oxygen atoms to the vacant $d$ orbitals of cobalt. The complexes are stable to air and have high melting (with decomposition) points and are characterized by the following formula:

$$CoX_2 \cdot (HOCH_2-C \equiv C-CH_2OH)_2$$

wherein X represents halogen such as bromide, chlorine or iodine.

Butynediol can be recovered unchanged from these complexes as will be shown hereinafter.

After evaporation of the reaction solution, the isolated crystals may be dried and extracted with ethyl acetate. The pink solid may be recrystallized from a mixture of 50 parts by volume of methyl ethyl ketone and 20 parts by volume of methanol.

In the case where pink crystals are formed almost at once, they are filtered and dried in a vacuum at room temperature.

The following examples will illustrate the preparation of the cobaltous halide-2-butynediol-1,4-diol complexes.

Example 1

118.9 grams (0.5 mole) of cobaltous chloride hexahydrate were dissolved in 250 ml. of acetone together with 86.0 grams (1.0 mole) of butynediol. The deep blue solution was evaporated to dryness with a rotary evaporator at house vacuum, then dried at 60° C. for 5 hours in a vacuum oven. After extraction of the dried purple solid with ethyl acetate (Soxhlet, 24 hours), 120.6 grams of a pink solid were obtained.

A 10 gram sample of the pink solid was recrystallized from a mixture of 50 ml. methyl ethyl ketone/20 ml. methanol. The light purple crystals were filtered, washed with diethyl ether, and dried at room temperature at house vacuum. The recrystallized product's elemental analyses showed:

C, 30.13%; H, 4.26%; Co, 21.3%; Cl, 24.60%. Calculated: C, 31.8%; H, 3.96%; Co, 19.5%; Cl, 23.5%.

Example 2

2.4 grams (0.01 mole) of cobaltous chloride hexahydrate were dissolved in 100 mls. of warm acetone and 24.4 grams (0.4 mole) of butynediol added. A pink crystalline material formed almost at once. After filtration and vacuum drying, 2.4 grams of pink complex were obtained, M.P. (with decomposition) 189° C.

Example 3

To a warm solution of 54.7 grams (0.25 mole) of cobaltous bromide in 100.0 ml. of acetone were added 43.0 grams (0.5 mole) of butynediol. A small amount, 18.6 grams (A), of pink crystals precipitated. The mother liquors were evaporated to dryness and 60.9 grams of purple material were isolated (B).

A and B were dried at 1 mm. Hg at room temperature. Both turned pink at the end of this time. B had a melting point (with decomposition) of 163–165° C.

A on elemental analyses showed C, 24.53%; Co, 14.7%. Calculated for $CoBr_2 \cdot 2C_4H_6O_2$ was: C, 24.3%; Co, 15.0%.

Example 4

4.2 grams (0.01 mole) of cobaltous iodide hexahydrate were dissolved in 100.0 mls. of warm acetone (35° C.) and 34.4 grams (0.4 mole) of butynediol added. On cooling to room temperature, 5.0 grams of pink complex were obtained, M.P. (with decomposition) 150–155° C.

Calculated: Co, 12.2%; C, 19.9%. Found: Co, 13.0%; C, 20.2%.

The infra-red spectrum of the complex of Example 1 was compared to that of butynediol and resembled that of butynediol except for the following:

(1) Shift of 1245 cm.$^{-1}$ and 1231 cm.$^{-1}$ band to 1228 and 1212 cm.$^{-1}$
(2) Shift of 1112 cm.$^{-1}$ bond due to —$CH_2OH$ to 985 cm.$^{-1}$
(3) Considerable increase in absorption of 1400 cm.$^{-1}$ bond, due to —$CH_2$— group.

These large shifts indicate participation of the

—$CH_2OH$— groups of butynediol in complex bonding. The triple bond of butynediol, unfortunately, does not absorb infrared radiation, being symmetrically a substituted triple bond.

Example 5

The crude complex (10 grams) of Example 2 was titrated with standard sodium hydroxide, requiring 0.058 mole of sodium hydroxide for complete precipitation of cobaltous hydroxide and loss of all pink color from the solution. The formula $CoCl_2 \cdot 2C_4H_6O_2$ would require 0.066 mole of sodium hydroxide if pure. Thus the crude complex assays 88% $CoCl_2 \cdot 2C_4H_6O_2$. Butynediol was recovered from the aqueous phase to give 4.4 grams of butynediol with a melting point of 55°–56° C. (87% of butynediol theoretical if the complex were pure.) Since the original compound was calculated as 88% pure, it is reasonable to conclude that butynediol was present in the complex as butynediol.

The butynediol cobaltous halide complexes prepared as above have catalytic activity in the Wacker process for acetaldehyde. They also have catalytic activity in hydrogenation, vinylation, polymerization and other reactions.

I claim:

1. Cobaltous halide-2-butyne-1,4-diol complex having the following formula:

$$CoX_2 \cdot (HOCH_2-C \equiv C-CH_2OH)_2$$

wherein X represents a halogen.

2. Cobaltous bromide-2-butyne-1,4-diol complex having the following formula:

$$CoBr_2 \cdot (HOCH_2-C \equiv C-CH_2OH)_2$$

3. Cobaltous chloride-2-butyne-1,4-diol complex having the following formula:

$$CoCl_2 \cdot (HOCH_2-C \equiv C-CH_2OH)_2$$

4. Cobaltous iodide-2-butyne-1,4-diol complex having the following formula:

$$CoI_2 \cdot (HOCH_2-C \equiv C-CH_2OH)_2$$

5. The process of preparing cobaltous halide-2-butyne-1,4-diol complex of the following formula:

$$CoX_2 \cdot (HOCH_2-C \equiv C-CH_2OH)_2$$

wherein X represents a halogen, which comprises treating one mole of a cobaltous halide with two moles of 2-butynediol-1,4 in acetone solution at about room temperature.

6. The process of preparing cobaltous bromide-2-butyne-1,4-diol complex of the following formula:

$$CoBr_2 \cdot (HOCH_2-C \equiv C-CH_2OH)_2$$

which comprises treating one mole of cobaltous bromide with two moles of 2-butynediol-1,4 in acetone solution at about room temperature.

7. The process of preparing cobaltous chloride-2-butyne-1,4-diol complex of the following formula:

$$CoCl_2 \cdot (HOCH_2-C \equiv C-CH_2OH)_2$$

which comprises treating one mole of cobaltous chloride with two moles of 2-butynediol-1,4 in acetone solution at about room temperature.

8. The process of preparing cobaltous iodide-2-butyne-1,4-diol complex of the following formula:

$$CoI_2 \cdot (HOCH_2-C \equiv C-CH_2OH)_2$$

which comprises treating one mole of cobaltous iodide with two moles of 2-butynediol-1,4 in acetone solution at about room temperature.

No references cited.

TOBIAS E. LEVOW, *Primary Examiner.*

A. P. DEMERS, *Assistant Examiner.*